United States Patent Office 3,360,272
Patented Dec. 26, 1967

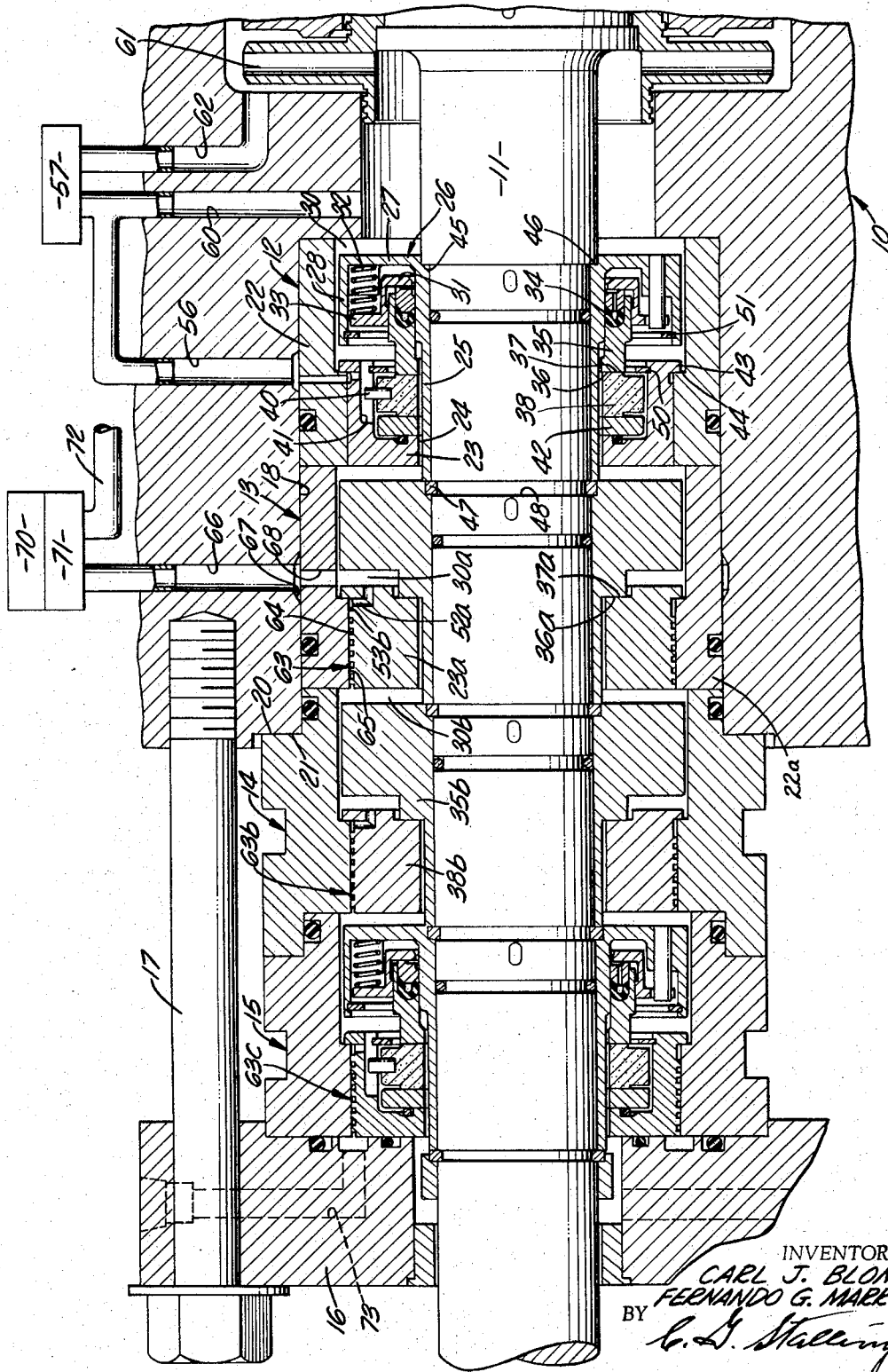

3,360,272
PRESSURE STAGING MECHANICAL SEAL
Carl J. Blom, San Marino, and Fernando G. Marrujo, La Habra, Calif., assignors to Borg-Warner Corporation, Chicago, Ill., a corporation of Illinois
Filed Aug. 17, 1964, Ser. No. 390,050
2 Claims. (Cl. 277—3)

ABSTRACT OF THE DISCLOSURE

A rotary shaft that extends through an opening in a housing is sealed to the housing by at least two mechanical seals spaced axially along the shaft to prevent substantial leakage along the shaft of fluid contained under pressure in the housing. Each of at least two of the mechanical seals which are adjacent to each other is bridged by a pressure reducing cell to provide a prescribed fluid differential across each one of the two adjacent seals.

---

This invention relates to mechanical seals to prevent leakage of fluid from a housing out along a shaft rotating therein, and in particular, to a new and improved combination mechanical seal and pressure reducing cell for reducing fluid pressure of a pump in stages so that high pressures may be tolerated.

It is a general object of this invention to provide a new and improved combination mechanical seal and pressure reducing cell which may be utilized in stages to prevent leakage of fluid out from between a housing and its rotating shaft.

Still another object of this invention is to provide a combination mechanical seal and pressure reducing cell utilizable in a high pressure pump and arranged to form a cartridge so that a selected plurality of such mechanical seal combinations may be used in tandem depending upon the pressures expected of the pump so as to prevent leakage along its rotating shaft.

Heretofore, it has been the practice to provide a pump with several mechanical seals which form stages of pressure reduction so that the high pressure of the pump would ultimately be reduced or substantially prevented from leaking out along a rotating shaft. However, to provide such multi-stage reduction of pressure, it was usually necessary to have a plurality of separate pressure reducing devices in the pump housing operable in combination therewith. This combination, however, proved cumbersome and required pump housing modifications and the like.

The present invention, by providing a combination mechanical seal and a spiral type pressure reducer or cell, has overcome the difficulties of such prior high pressure pumps and mechanical seals by making each combination so that the number of stages of pressure reduction in a pump may be varied without the additional problem of adding valves. Each combination mechanical seal acts, as it were, as a unitary cartridge and additional pressure reduction may be accomplished by the mere adding of one or more combination mechanical seal and pressure reducing cells one after another in tandem along a pump shaft. In the instant invention the pressure reducer forms part of the mechanical seal housing so as to accomplish the unity and independent operability of the combination as aforesaid.

Accordingly, still a more specific object of this invention is to provide a mechanical seal in combination with a pressure reducing means which forms part of the seal housing and which acts to reduce the differential pressure acting upon the sealing faces of the seal.

Still another object of this invention is to provide a combination mechanical seal and integral pressure reducing system so that it can be used as a cartridge to stage a pump as desired.

Still another object of this invention is to provide a pump with cartridge type mechanical seals in combination therewith, the number of which may be selected according to the desired pressure reduction.

Briefly stated, the invention is embodied in apparatus for sealing a rotary shaft to a housing having a shaft opening through which the rotary shaft extends including a first mechanical seal having a rotary sealing ring connected to the shaft for rotation therewith and a relatively stationary sealing ring carried by the housing, the rings having sealing faces in opposed relationship, and a second mechanical seal axially spaced from the first mechanical seal to provide an enclosed chamber between the mechanical seals, the second mechanical seal having a second rotary sealing ring connected to the shaft for rotation therewith and a second relatively stationary sealing ring carried by the housing, the second rings having sealing faces in opposed relationship, wherein the improvement includes a first pressure reducing cell bridging the first mechanical seal for direct fluid communication between one side of the first mechanical seal and the enclosed chamber, and a second pressure reducing cell bridging the second mechanical seal for direct fluid communication between the opposite side of the second mechanical seal and the enclosed chamber, each of said pressure reducing cells comprising means providing an open, elongated fluid conduit having fixed dimensions, whereby a fluid pressure differential between the one side of the first mechanical seal and the opposite side of the second mechanical seal causes fluid from the one side to continuously flow through the first pressure reducing cell, thence through the enclosed chamber, thence through the second pressure reducing cell, and thence to the opposite side of the second mechanical seal, thus to establish in the enclosed chamber a fluid pressure that is intermediate the fluid pressure on the one side of the first mechanical seal and the fluid pressure on the opposite side of the second mechanical seal, each of the mechanical seals thereby being automatically subjected to a prescribed fluid pressure differential thereacross. Each pressure reducing cell may include a spiral groove about the periphery of a stationary sealing ring, the spiral groove facing a cylindrical bore in the housing.

Other and additional objects of this invention will be apparent to those skilled in the art after a study of the following specification and the drawing which forms a part hereof and wherein there is shown in the drawing a semi-schematic, cross-sectional view of a mechanical seal and pressure cell combination according to the teachings of this invention and incorporated in a pump and system.

Turning now to the drawing, it can be seen that there is shown a housing 10 of a pump in which fluid at high pressure is pumped by an impeller (not shown) rotating on a pump shaft 11. The housing and shaft are provided with a mechanical seal asembly, which in this embodiment comprises a first combination mechanical seal, indicated in its entirety as 12, a second combination mechanical seal, indicated in its entirety as 13, a third combination mechanical seal, indicated in its entirety as 14, and a fourth combination mechanical seal, indicated in its entirety as 15. Each combination mechanical seal, 12, 13 14 and 15, is held on the pump housing 10 by a suitably apertured flange 16 and studs 17. In this embodiment, combination mechanical seals 12 and 13 are located fully within a counter-bore 18 in the housing 10, and mechanical seal combination 14 has an enlarged outer diameter so as to present a face 20 which abuts against a face 21 of the housing 10 to permit the tightening of the flange 16 by the stud 17 and hold the entire assembly on the housing.

Mechanical seal combination 12 comprises a seal housing 22 fitted tightly within the counterbore 18 aforesaid, in which is incorporated a sealing ring back-up member 23 having an internal bore 24 of a diameter greater than the diameter of the shaft 11 at the point where the back-up member telescopes the shaft so as to permit a sleeve 25 of rotatable sleeve member 26 to securely fit over the shaft and be spaced from the bore 24. This rotatable sleeve member 26 is provided with an integral radially outwardly extending wall 27 and an axially extending wall 28 spaced from internal counterbore or seal chamber 30 of the seal housing 22 to permit free movement thereof. A follower 31 is telescoped within the sleeve member 26 and is spring loaded by helical spring 32, one end of which is against the wall 27 with the other end against a radial wall 33. The latter is integral with the follower 31 to urge a sealing cup 34 axially along the sleeve member 26. This sealing cup 34, in turn, is urged against a rotatable sealing ring 35, and the latter is provided with a sealing face 36, which cooperates with a stationary sealing face 37 of a stationary seal ring 38 in the conventional manner of mechanical seals. Stationary seal ring 38 is formed of a graphite or other suitable material and is provided with a pin 40 acting within a slot 41 in the back-up member 23 so as to remain stationary. A rigid ring 42 is also disposed between the back-up member 23 and the seal ring 38 to prevent distortion of the stationary seal face 37.

When assembled in the seal housing 22, the back-up member 23 is urged axially to the left by action of the spring 32 thorough the sealing rings but is prevented from movement by a radially extending flange 43 which overlaps and is urged against wall 44 on the seal housing 22. The sleeve member 26 is prevented, when so assembled, from movement to the right by the action of a step 45 on the shaft 11, which cooperates with a complementary step 46; and from movement to the left by lock ring 47 in a groove 48 in the shaft. Suitable lock rings 50 and 51 are in the stationary back-up member 23 and in the rotating sleeve member 26, respectively, for assembly and disassembly of mechanical seals as integral units.

The vent passage 56 is connected to a heat exchanger 57 of any conventional type for cooling fluid passing therethrough. Fluid cooled by the heat exchanger 57 is communicated to the seal chamber 30 and to impeller 61, which in turn forces the fluid through passage 62. Thus, the fluid for the first stage mechanical seal combination 12 is continuously circulated and recirculated by impeller 61 to the heat exchanger 57 by passage 62 and through the mechanical seal combination.

Mechanical seal combination 13 is provided with a stationary back-up member 23a which is identical in function and construction as back-up member 23 described in connection with mechanical seal combination 12, except that radial passage 52a and peripheral groove 53b thereof communicate with a pressure reducing cell 63. This pressure reducing cell in turn communicates with seal chamber 30b of the mechanical seal combination 14.

Pressure reducing cell 63 comprises a spiral groove 64 formed in the periphery of the back-up member which cooperates with inner wall 65 of the seal housing 22a to form the spiral pressure reducer. As is well known, the pressure entering groove 64 will be lowered by the operation of the groove, so that the pressure in seal chamber 30b of combination mechanical seal 14 will be less than that in seal chamber 30a. The amount of reduction depends on the length and type of groove and can be varied by several techniques such as shown in the U.S. Patents No. 1,079,663 to Raffensdorfer, No. 993,831 to Junggren, or No. 2,312,834 to Hahn.

Also in this particular application, seal chamber 30a is provided with cooled fluid directed thereto through passage 66 and peripheral groove 67 in the pump housing, which in turn communicates with a radial groove 68 in the seal housing 22a. This fluid circulating in passage 66 is cooled by a heat exchanger 70 and the pressure reduced by reducer 71 which receives its fluid from passage 72 communicating with the fluid in the pump impeller (not shown). By reason of this cooled fluid, the combination mechanical seal 13 is prevented from overheating, which is likely to occur during standby time when the impeller 61 and the circulation through the mechanical seal combination 12 is inoperative, and in this arrangement fluid in seal chamber 30a is considerably cooler than that which is entering the seal chamber 30 in the mechanical seal combination 12, in order that chamber 30a may be maintained at a lower operating temperature.

With the above described invention it can be seen that fluid under high pressure from the pump will be communicated to the combination mechanical seal 12 and although continuously circulated by the impeller 61, the pressure in the seal chamber 30 will be substantially pump pressure; however, the pressure communicated to the seal chamber 30a past seal faces 36 and 37 and through the heat exchanger and pressure reducers 70 and 71 will be less than the pump pressure, so that a proper differential pressure exists across the seal faces 36 and 37 so that the latter will properly operate with sufficient lubrication and cooling fluid, inasmuch as seals of this type are designed to operate at a prescribed differential pressure.

Likewise, inasmush as the fluid pressure in mechanical seal combination 13 is less than pump outlet pressure, in order that the mechanical seal faces 36a and 37a operate with a proper differential pressure, as aforesaid, fluid from the seal chamber 30a is communicated to the seal chamber 30b of mechanical seal combination 14 through the above described pressure reducing cell 63. Thus, the pressure between mechanical seal combinations 13 and 14 properly reduced or staged.

As between mechanical seal combinations 14 and 15, the function of the component parts thereof operate identically as the component parts of mechanical seal combinations 13 and 14 to stage the pressures, and like components parts are given identical reference numerals, except for the suffix letters.

It can be seen from the above description that any number of combination mechanical seals may be utilized to stage a pressure reduction to the terminal combination mechanical seal herein shown as 15, with excess fluid pressure escaping from the terminal pressure reducer, such as 63c, being communicated by passage 73 back to inlet or atmosphere, or any low-pressure zone. It is also possible within the purview of this invention, depending upon the conditions under which the pump is to be used, that the mechanical seals such as 12 and 13 may be eliminated, so that the entire pressure staging may be made up of mechanical seal combinations such as 14 and 15, especially where high temperatures are not a problem.

Furthermore, while a conventional heat exchanger has been shown as being usable in this assembly, a heat exchanger such as shown in the United States Patent No. 3,100,523 of F. G. Marrujo, is preferred.

What is claimed is:

1. Apparatus for sealing a rotary shaft to a housing having a shaft opening through which the rotory shaft extends including a first mechanical seal having a rotary sealing ring connected to the shaft for rotation therewith and a relatively stationary sealing ring carried by the housing, the rings having sealing faces in opposed relationship, and a second mechanical seal axially spaced from the first mechanical seal to provide an enclosed chamber between the mechanical seals, the second mechanical seal having a second rotary sealing ring connected to the shaft for rotation therewith and a second relatively stationary sealing ring carried by the housing, the second rings having sealing faces in opposed relationship, wherein the improvement comprises a first pressure reducing cell bridging said first mechanical seal for direct fluid communication between one side of said first mechanical seal and said enclosed chamber, and a second pressure reducing cell bridging said second mechanical seal for direct fluid communication between the opposite side of said second mechanical seal and said enclosed chamber each of said pressure reducing cells comprising means providing an open, elongated fluid conduit having fixed dimensions, whereby a fluid pressure differential between said one side of said first mechanical seal and said opposite side of said second mechanical seal causes fluid from said one side to continuously flow through said first pressure reducing cell, thence through said enclosed chamber, thence through said second pressure reducing cell, and thence to said opposite side of said second mechanical seal, thus to establish in said enclosed chamber a fluid pressure that is intermediate the fluid pressure on said one side of said first mechanical seal and the fluid pressure on said opposite side of said second mechanical seal, each of said mechanical seals thereby being automatically sujected to a prescribed fluid pressure differential thereacross.

2. Apparatus for sealing a rotary shaft to a housing as defined in claim 1 wherein said first relatively stationary sealing ring has means providing a cylindrical periphery engaging a first cylindrical bore in the housing and said first pressure reducing cell includes means providing a spiral groove in said cylindrical periphery, said groove facing said first cylindrical bore; and said second relatively stationary sealing ring has means providing a second cylindrical periphery engaging a second cylindrical bore in the housing and said second pressure reducing cell includes means providing another spiral groove in said second cylindrical periphery, said another spiral groove facing said second cylindrical bore.

References Cited
UNITED STATES PATENTS

| | | | |
|---|---|---|---|
| 993,831 | 5/1911 | Junggren | 138—43 |
| 2,175,868 | 10/1939 | Bentley | 277—3 |
| 2,326,825 | 8/1943 | Browne et al. | 277—65 X |
| 2,631,071 | 3/1953 | Alden | 277—134 X |
| 2,921,805 | 1/1960 | Shevchenko | 277—62 |
| 3,035,841 | 5/1962 | Riester | 277—3 |
| 3,179,422 | 4/1965 | Phillips | 277—3 |

SAMUEL ROTHBERG, *Primary Examiner.*